(12) United States Patent
Hsu

(10) Patent No.: US 6,966,530 B2
(45) Date of Patent: Nov. 22, 2005

(54) END SECURING DEVICE FOR TELESCOPIC TUBE

(75) Inventor: Ben Hsu, Changhua Hsien (TW)

(73) Assignee: Ching Feng Blinds Ind. Co., Ltd., Changhua Hsien (TW)

( * ) Notice: Subject to any disclaimer, the term of this patent is extended or adjusted under 35 U.S.C. 154(b) by 0 days.

(21) Appl. No.: 10/815,738

(22) Filed: Apr. 2, 2004

(65) Prior Publication Data

US 2005/0218278 A1    Oct. 6, 2005

(51) Int. Cl.$^7$ .............................................. F16B 47/00
(52) U.S. Cl. ............................... 248/206.2; 248/205.5; 248/206.3
(58) Field of Search ......................... 248/200.1, 205.5, 248/205.8, 206.2, 205.6, 206.1, 206.3, 205.9; 211/105.1, 105.3, 123

(56) References Cited

U.S. PATENT DOCUMENTS

| | | | | |
|---|---|---|---|---|
| 2,233,870 A | * | 3/1941 | Muter | 248/205.8 |
| 4,842,912 A | * | 6/1989 | Hutter, III | 428/66.6 |
| 5,087,005 A | * | 2/1992 | Holoff et al. | 248/205.8 |
| 6,045,111 A | * | 4/2000 | Hsieh | 248/551 |
| 6,234,435 B1 | * | 5/2001 | Yeh | 248/205.5 |
| 6,478,271 B1 | * | 11/2002 | Mulholland | 248/205.8 |
| 6,502,794 B1 | * | 1/2003 | Ting | 248/206.2 |

* cited by examiner

Primary Examiner—Ramon O. Ramirez
Assistant Examiner—Steven Marsh
(74) Attorney, Agent, or Firm—Troxell Law Office, PLLC

(57) ABSTRACT

An end securing device for a telescopic tube includes a vacuum sucker made up of a suction cup, a retaining piece, a control piece, and an activation piece to be mounted to both ends of a telescopic tube thereof respectively wherein the suction cup has a driven post protruding at one side of a conic suction space to be engaged with the retaining piece thereby, and the retaining piece has a registration column and a central through hole in sleeve engagement with a coupling groove of the control piece. The driven post of the suction cup led through an engaging through hole of the control piece is securely screwed up to a linkage rod of the activation piece thereof. In operation, the control piece is rotated to one side via a push block, permitting oblique conic sliding guide plates of the control piece to ascend along stop ribs of the retaining piece till the control piece abuts tight against the activation piece so as to move the driven post thereof and raise upwards the suction cup therewith to form an empty vacuum space at the suction space therein for secure attachment of the suction cup to the surface of walls thereon. Otherwise, the control piece is rotated to the other side to descend the sliding guide plates thereof so as to release the activation piece and the suction cup therewith for air to let in to the suction space thereof to detach the suction cup thereof. Thus, the telescopic tube is easily and quickly adjusted in length by direct stretching or pushing without a spring unit applied therein and securely mounted onto the walls via the vacuum suckers thereof.

9 Claims, 5 Drawing Sheets

US 6,966,530 B2

END SECURING DEVICE FOR TELESCOPIC TUBE

BACKGROUND OF THE INVENTION

The present invention is related to an end securing device for a telescopic tube, including a vacuum sucker made up of a suction cup, a retaining piece, a control piece, and an activation piece to be mounted to both ends of a telescopic tube respectively wherein the suction cup has a driven post protruding at one side to be engaged with the retaining piece thereby, and the retaining piece has a registration column in sleeve engagement with a coupling groove of the control piece. The driven post of the suction cup led through an engaging through hole of the control piece is securely screwed up to a linkage rod of the activation piece thereof; whereby, the control piece of the vacuum sucker is rotated to one side or the other for oblique conic sliding guide plates of the control piece to ascend or descend along stop ribs of the retaining piece, actuating the activation piece and the suction cup therewith to precisely attach or detach the suction cup onto or from the surface of walls without any other spring unit applied thereto, facilitating an easy and fast adjustment of the telescopic tube thereof.

Please refer to FIGS. 1, 2. A conventional telescopic tube 10 is made up of an inner and outer hollow tubes 11, 12, and a spring unit 13 adapted to the inner side of the inner and outer tubes 11, 12 respectively. A sealing cap 20 or a suction cup 30 is respectively mounted to the corresponding outer side of the inner and outer tubes 11 thereof as shown in FIG. 1 or 2. In practical use, the telescopic tube 10 is adjusted in length by rotating either clockwise or counterclockwise before mounted onto walls via the spring units 13 abutting against the sealing caps 20 or pressing against the suction cups 30 thereof to attach the sealing caps 20 or the suction cups 30 onto the surface of the walls thereof.

There are some drawbacks to such conventional telescopic tube 10. First, the telescopic tube 10 is rotated either clockwise or counterclockwise to elastically stretch or compress the spring unit 13 before the inner and outer tubes 11, 12 thereof are adjusted into a proper length. In case adjusted in a wrong direction, the inner and outer tubes 11, 12 thereof must be inconveniently readjusted and rotated into the right direction, which is rather troublesome and time-consuming. Second, the suction cups 30 are elastically pressed against by the spring unit 13 to suck constantly onto the surface of the walls. In case of elastic fatigue of the spring unit 13 due to long time of use or uneven attaching force of the suction cups 30 due to a rough surface of the walls, the suction cups 30 pulled by the gravity force of the inner and outer tubes 11, 12 thereof can easily lose the support of the spring unit 13 and come off from the walls, messing up the articles suspending at the telescopic tube 10 thereon.

SUMMARY OF THE PRESENT INVENTION

It is, therefore, the primary purpose of the present invention to provide an end securing device for a telescopic tube, including a vacuum sucker made up of a suction cup, a retaining piece, a control piece, and an activation piece to be mounted to both ends of a telescopic tube thereof respectively wherein the control piece of the vacuum sucker is rotated to one side or the other for oblique conic sliding guide plates of the control piece to ascend or descend along stop ribs of the retaining piece, actuating the activation piece and the suction cup therewith to precisely attach or detach the suction cups onto or from the surface of walls without any other spring unit applied thereto, and thus permitting the telescopic tube to be directly extended or pushed to achieve an easy and fast adjustment of the telescopic tube in length.

It is, therefore, the second purpose of the present invention to provide an end securing device for a telescopic tube wherein the suction cup is provided with inserting ribs registered with an engaging groove of the retaining piece and limited by abutting ribs defining both side of the engaging groove thereof, securely preventing the suction cup from being deformed when stretched by a driven post protruding at one side of the suction cup thereof to keep the authentic round shape of the suction cup in sucking attachment and achieve the best using condition thereof.

It is, therefore, the third purpose of the present invention to provide an end securing device for a telescopic tube wherein via their oblique conic slopes, the sliding guide plates of the control piece thereof ascend or descend along the stop ribs of the retaining piece thereof to actuate the activation piece and the suction cups therewith. The activation piece abutted tight by the control piece to move therewith will raise upwards a suction space of the suction cup to form an empty vacuum space therein, precisely attaching the suction cup to the surface of the walls thereon.

DETAILED DESCRIPTION OF THE PREFERRED EMBODIMENTS

Figure 1:
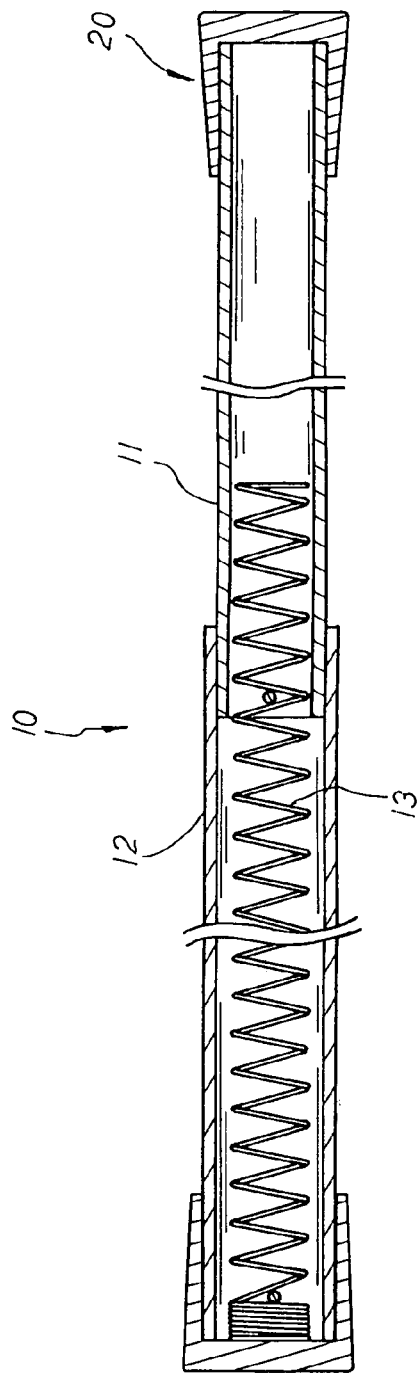
FIG. 1 is a cross sectional view of a conventional telescopic tube.
Figure 2:
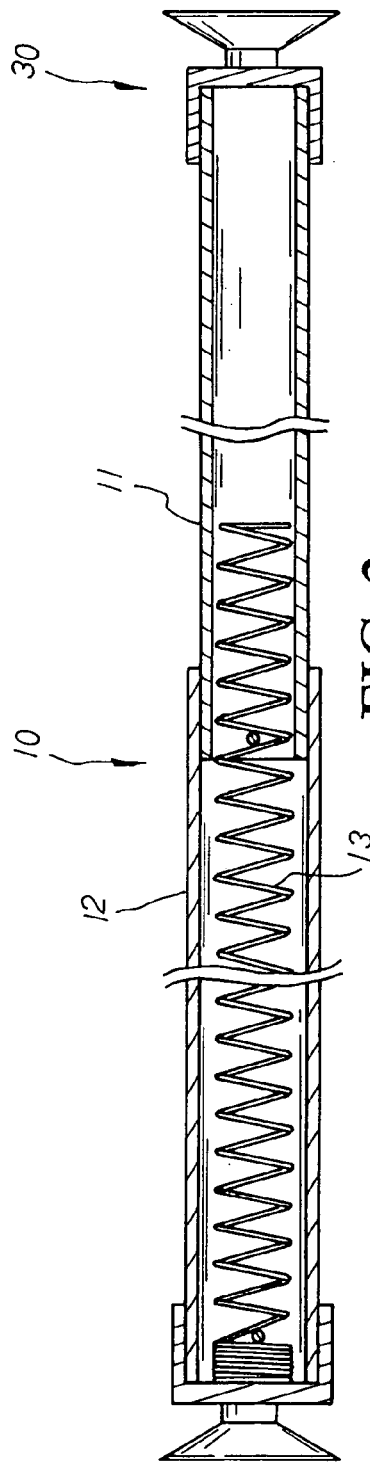
FIG. 2 is a cross sectional view of another conventional telescopic tube.
Figure 3:
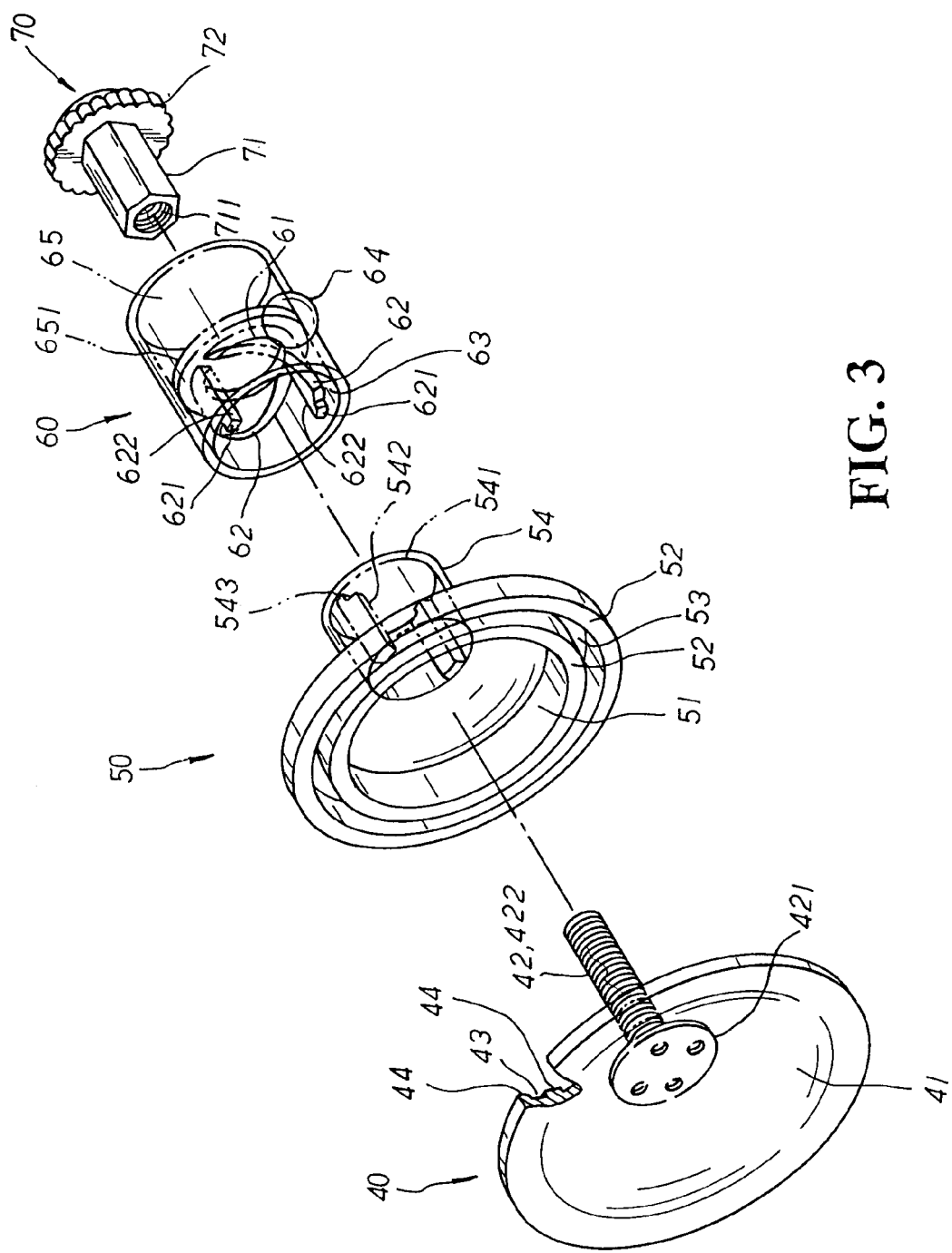
FIG. 3 is a perspective exploded view of the present invention.
Figure 4:
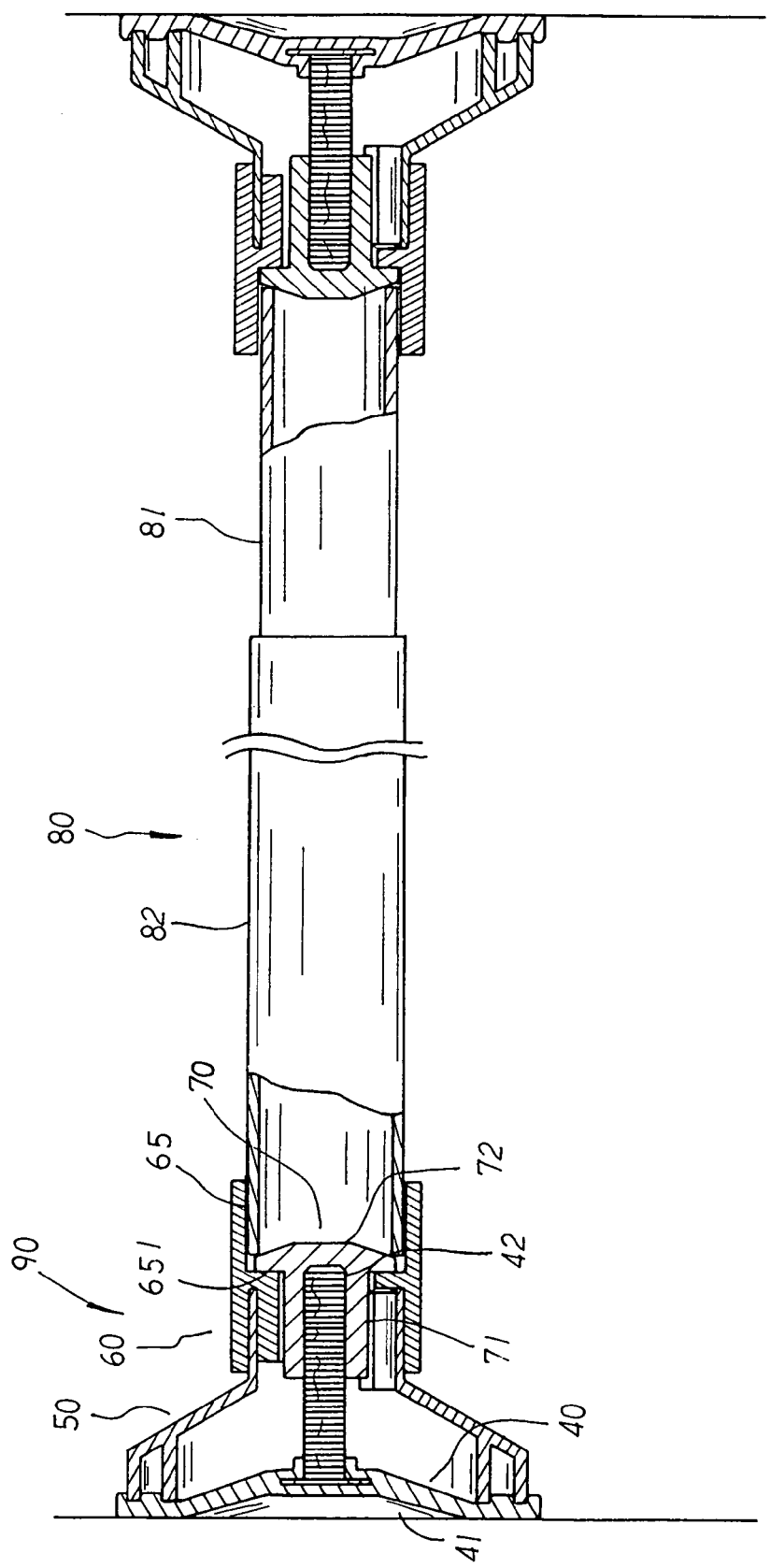
FIG. 4 is a cross sectional view of the present invention in assembly.

Please refer to FIG. 3. The present invention is related to an end securing device for a telescopic tube, including a suction cup 40, a retaining piece 50, a control piece 60, and an activation piece 70. The suction cup 40 has a conic suction space 41 defined at the base thereon, and a driven post 42 protruding at the other side of the suction cup 41 thereof. The driven post 42 having a metal support plate 421 embedded at one end is equipped with an external threaded section 422 disposed at the outer periphery thereon. The suction cup 40 also has an annular limiting groove 43 circumscribing at the edge of the outer periphery thereon, and an annular inserting rib 44 protruding at both sides of the annular limiting groove 43 thereof respectively. The retaining piece 50 includes a conic retaining chamber 51 concaved at one side thereon with two annular abutting ribs 52 protruding at the outer periphery of the retaining chamber 51 thereon to form an engaging groove 53 there-between, and a registration column 54 with a central through hole 541 extending at the other side thereof in communication with the retaining chamber 51 via the central through hole 541 thereof. A pair of opposite stop ribs 542 each having a step-wise engaging leg 543 disposed at one end thereof is symmetrically protruding at the inner wall of the central through hole 541 of the registration column 54 thereof. The control piece 60 has an engaging through hole 61 of smaller diameter disposed at the central inner side thereof, and a pair of oblique conic sliding guide plates 62 symmetrically extending at one side of the engaging through hole 61 thereof with each having an L-shaped locating leg 621 cut at one end thereof, and a level limiting plane 622 disposed at one lateral side thereon. An annular coupling groove 63 is formed at the sliding guide plates 62 and the inner wall of the control piece 60 there-between, and a ball-like push block 64 is properly protruding at the outer periphery of the control piece 60 thereon. A receiving chamber 65 with a stop ring 651 is disposed at the other side of the engaging through hole 61 thereof, correspondingly matched to the outer diameter of an inner and outer tubes 81, 82 of a telescopic tube 80 respectively as shown in FIG. 4. The activation piece 70 is made up of a hexagonal linkage rod 71 with a screw hole 711 disposed at one end therein, and a support section 72 of larger diameter attached at the other side of the linkage rod 71 thereof.

Please refer to FIG. 4. In assembly, the driven post 42 of the suction cup 40 is led through the central through hole 541 of the retaining piece 50 till the abutting ribs 52 are mutually engaged with the limiting groove 43 thereof and the inserting ribs 44 retained at the engaging groove 53 therein in abutment with the abutting ribs 52 at both sides thereof. The coupling groove 63 of the control piece 60 and the registration column 54 of the retaining piece 50 are mutually joined in sleeve engagement with the limiting planes 622 disposed at the corresponding opposite sides of the sliding guide plates 62 thereof abutted against the lateral sides of the stop flanges 542 thereof respectively to locate the driven post 42 thereof at the engaging through hole 61 therein. The activation piece 70 is then joined to the receiving chamber 65 with the screw hole 711 securely registered with the external threaded section 422 till the linkage rod 71 is located at the engaging through hole 61 therein and the support section 72 abutted against the stop ring 651 thereof to complete the assembly of a vacuum sucker 90. Both ends of the telescopic tube 80 are respectively mounted to the receiving chamber 65 of the control piece 60 of one vacuum sucker 90 to complete the assembly of the present invention.

Figure 5:
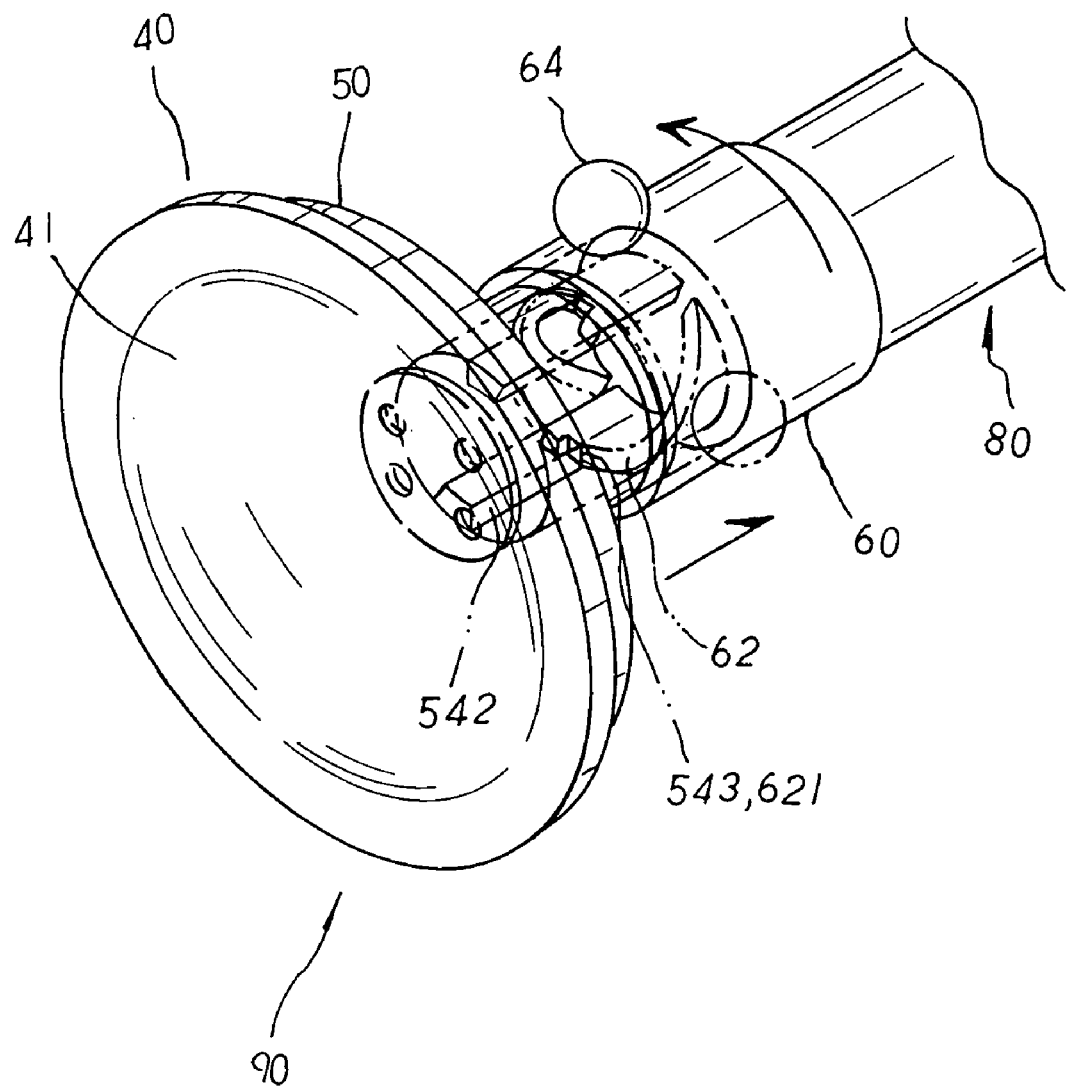
FIG. 5 is a perspective view of the present invention in operation.
Figure 6:
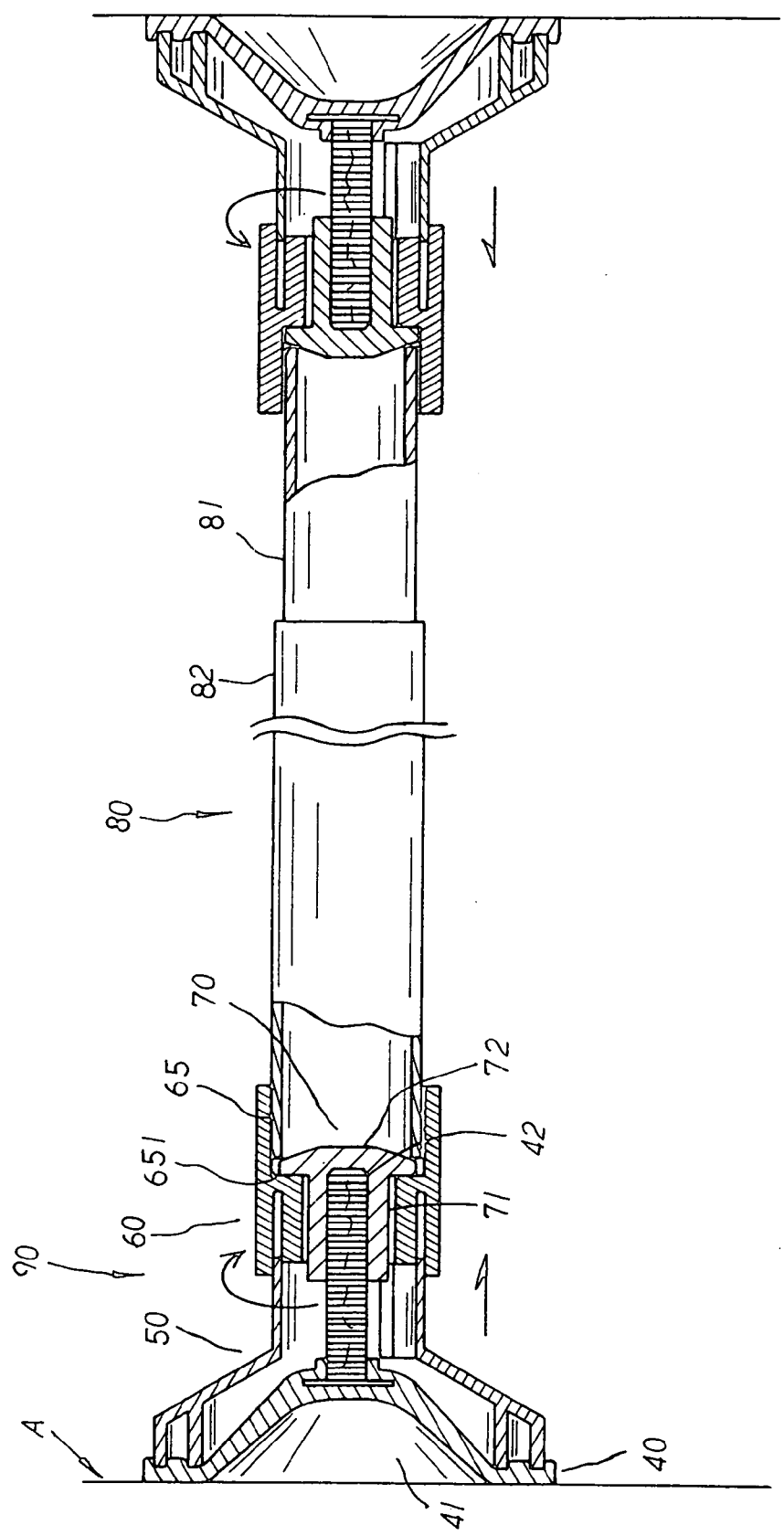
FIG. 6 is a diagram showing the present invention in sucking attachment onto walls.

Please refer to FIGS. 5 to 6 inclusive. In practical use, both ends of the telescopic tube 80 are directly extended outwards or pushed inwards till the suction cups 40 of the vacuum suckers 90 are levelly abutted against the surface of walls A respectively. The push block 64 of the control piece 60 is pushed to one side to activate the movement of the coupling groove 63 rotating along the registration column 54 therewith. And the oblique conic slopes of the sliding guide plates 62 abutting against the engaging legs 543 of the stop ribs 542 permits the sliding guide plates 62 to ascend along the engaging legs 543 thereof to abut the stop ring 651 of the control piece 60 tight against the support section 72 of the activation piece 70 thereof. The linkage rod 71 of the activation piece 70 moved by the control piece 60 will activate the driven post 42 to raise upwards the suction cup 40 therewith till the engaging legs 543 are respectively abutted against the locating legs 621 of the sliding guide plates 62 thereof. Thus, the suction space 41 forms an empty vacuum space inside, precisely and securely attaching the suction cups 40 to the walls A thereon. Besides, the inserting ribs 44 of the suction cup 40 securely adapted at the engaging groove 53 of the retaining piece 50 and limited by the abutting ribs 52 thereof can prevent the suction cup 40 from being deformed when stretched by the driven post 42 in operation thereof so as to keep the authentic round shape of the suction cup 40 and achieve the best using condition thereof. Otherwise, the push block 64 is pushed to the other side to descend the sliding guide plates 62 of the control piece 60 thereof, releasing the activation piece 70 from the pressing abutment of the control piece 60 therewith. Meanwhile, the suction cups 40 are released for air to let in to the suction spaces 41 thereof so as to detach the suction cups 40 from the walls A for the retrieval of the telescopic tube 80 thereof.

What is claimed is:

1. An end securing device for a telescopic tube having inner and outer tubes, the end securing device comprising:
    two vacuum suckers, each of the two vacuum suckers being located at one of two opposing ends of the telescopic tube and having:
    a) a suction cup movable between first and second positions and having:
        i) a conic suction space located on first end thereof; and
        ii) a driven post protruding from a second end thereof;
    b) a retaining piece engaging the second end of the suction cup on a first end thereof and having:
        i) a registration column located on a second end thereof and having a central through hole; and
        ii) a pair of opposite stop ribs symmetrically positioned on a wall of the central through hole;
    c) a control piece rotatably engaging the retaining piece and having:
        i) a coupling groove located at a first end thereof;
        ii) a pair of oblique conic sliding guide plates symmetrically positioned on an interior of the coupling groove and threadedly engaging the pair of opposite stop ribs;
        iii) a receiving chamber located at a second end thereof; and
        iv) an engaging through hole communicating with the coupling groove and the receiving chamber, the driven post being inserted into the engaging through hole; and
    d) an activation piece inserted into the receiving chamber of the control piece and connected to the driven post,
    wherein, when the suction cup is in the first position, the control piece and the retaining piece are rotated to engage the registration column with a stop ring of the control piece, the control piece moving the activation piece toward the first end of the suction cup making the conic suction space smaller; and, when the suction cup is in the second position, the control piece and the retaining piece are rotated to space the registration column apart from the stop ring, the control piece moving the activation piece away from the first end of the suction cup making the conic suction space larger.

2. The end securing device according to claim 1, wherein the driven post has an external threaded section on an outer periphery thereof.

3. The end securing device according to claim 1, wherein the suction cup has two annular inserting ribs located on an outer periphery thereof and an annular inserting rib located between the two annular inserting ribs.

4. The end securing device according to claim 1, wherein the retaining piece includes a conic retaining chamber having a concaved interior communicating with the central through hole of the registration column and two annular abutting ribs extending from the first end of the retaining piece and forming an engaging groove there between.

5. The end securing device according to claim 1, wherein each of the pair of opposite stop ribs having a step-wise engaging leg located on an end thereof.

6. The end securing device according to claim 1, wherein each of the pair of oblique conic sliding guide plates have an L-shaped leg located at an end opposite the stop ring and a level limiting plane located on a lateral side thereof.

7. The end securing device according to claim 1, wherein the control piece has a ball shaped push block located on an exterior periphery thereof.

8. The end securing device according to claim 1, wherein one of the inner and outer tubes is inserted into the receiving chamber of the control piece.

9. The end securing device according to claim 1, wherein the activation piece includes a hexagonal linkage rod located on a first end thereof having a screw hole and a support section located on a second end thereof, the driven post is threadedly connected to the screw hole, the support section having a diameter larger than a diameter of the hexagonal linkage rod.

* * * * *